United States Patent [19]
Factor

[11] Patent Number: 5,745,217
[45] Date of Patent: Apr. 28, 1998

[54] SYSTEM FOR DETECTING, CODING, AVOIDING, AND REMOVING DEFECTS ON A PHOTOSENSITIVE WEB

[75] Inventor: Ronda Ellen Factor, Rochester, N.Y.

[73] Assignee: Eastman Kodak Company, Rochester, N.Y.

[21] Appl. No.: 627,761

[22] Filed: Mar. 29, 1996

[51] Int. Cl.[6] .................................................. G03B 27/52
[52] U.S. Cl. ........................... 355/40; 396/310; 396/311; 396/319
[58] Field of Search ....................... 355/39, 40; 250/225, 250/201.1, 208.6, 548, 559.4, 559.41, 559.42, 559.43, 559.44, 559.45; 396/310, 311, 319

[56] References Cited

U.S. PATENT DOCUMENTS

| | | |
|---|---|---|
| 3,149,529 | 9/1964 | Critchlow . |
| 3,375,744 | 4/1968 | Schieven . |
| 3,495,782 | 2/1970 | Nelson et al. . |
| 3,723,122 | 3/1973 | Yano et al. . |
| 4,841,340 | 6/1989 | Tokuda . |
| 4,896,186 | 1/1990 | Tokuda . |
| 4,951,086 | 8/1990 | Hicks . |
| 5,160,952 | 11/1992 | Iwashita et al. . |
| 5,281,993 | 1/1994 | Crochetierre et al. . |

*Primary Examiner*—R. L. Moses
*Assistant Examiner*—Shival Virmani
*Attorney, Agent, or Firm*—Frank Pincelli; David A. Novais

[57] ABSTRACT

A method and system for detecting and coding information regarding the defects into a photosensitive web containing a magnetic media. The system includes a scanner for scanning a photosensitive web for determining defects and producing a signal which provides information with respect to the defect. The system further includes a device for taking the signal and transforming it to a form capable of being placed on the magnetic media; and a recording head for recording the information onto the web. The information read may be used to locate and remove the area of the web containing the defect or advancing the web so that the portion of the web having the defect will not be used.

15 Claims, 9 Drawing Sheets

SYSTEM FOR DETECTING, CODING, AVOIDING, AND REMOVING DEFECTS ON A PHOTOSENSITIVE WEB

FIELD OF THE INVENTION

The present invention relates to the manufacturing and use of a photosensitive web.

BACKGROUND OF THE INVENTION

In the manufacturing and use of photosensitive material it is important to quickly determine any defects that may be present and avoid having these defects being used in printing and developing of photosensitive material. It is also important to minimize the amount of waste that occurs either at manufacturing and/or printing. If a print is made on a portion of photosensitive material having a defect, then the order must be reprinted. This, of course, takes substantial time requiring special handling by an individual in pulling the order out of the batch and reprinting the order using less efficient equipment. Therefore, it is important to avoid the providing of photosensitive material having defects and/or printing of images on portions of photosensitive material having defects.

Briefly, the present invention provides a system and apparatus which includes providing a photographic material having a magnetic recording media upon which magnetically encoded information may be written. During the manufacturing process of photosensitive material, the photosensitive material is scanned for defects. When defects are detected, information regarding the location and size of the defects are recorded onto the magnetic media. This information may then be used at a later time at the manufacturing plant to remove the defects, or can be used by a printing apparatus to avoid exposure of images in the area containing the defects.

SUMMARY OF THE INVENTION

In one aspect of the present invention there is provided a system for detecting and coding information regarding the defects into a photosensitive web containing a magnetic media. The system comprises:

a scanner for scanning a photosensitive web for determining defects and producing a signal which provides information with respect to the defect;

means for taking the signal and transforming it to a form capable of being placed on the magnetic media; and a recording head for recording the information onto the web.

In another aspect of the present invention there is provided an apparatus for printing images on a photosensitive web having a magnetic media. The magnetic media contains pre-recorded information regarding defects that may be present on the web. The apparatus is provided with a reader for reading the information recorded on the magnetic media. The apparatus further includes a print gate for the locating of the photosensitive web for printing and means for advancing the photosensitive web so that any defect present on the web will not be located at the print gate, thus avoiding the printing of images on the portion of the photosensitive web having a defect.

In yet another aspect of the present invention there is provided a method for detecting and coding a defect on a photosensitive web containing a magnetic media. The method comprises the steps of:

a) scanning a photosensitive web for defects and producing a signal, which is indicative of a defect;

b) providing information on the magnetic media regarding the placement, location, and type of defect detected; and c) removing the defect from said web prior to the web being placed on a supply reel.

In still another aspect of the present invention there is provided a method for loading a strip of photosensitive material from a web of photosensitive material into a film cartridge, said photosensitive web having a magnetic media, comprising the steps of:

a) scanning the web with a scanner capable of detecting defects present on the web;

b) recording information on the magnetic media regarding the defects;

c) loading the photosensitive material successively onto a plurality of film holders; and d) reading the information on the magnetic web prior to loading the individual strip into each holder so that a portion of the web having any defects will not be loaded into the holder.

These, and other advantages of the present invention will be more clearly understood and appreciated from a view of the following detailed description and appended claims, and by reference to the accompanying drawings.

DETAILED DESCRIPTION OF THE INVENTION

Figure 1:
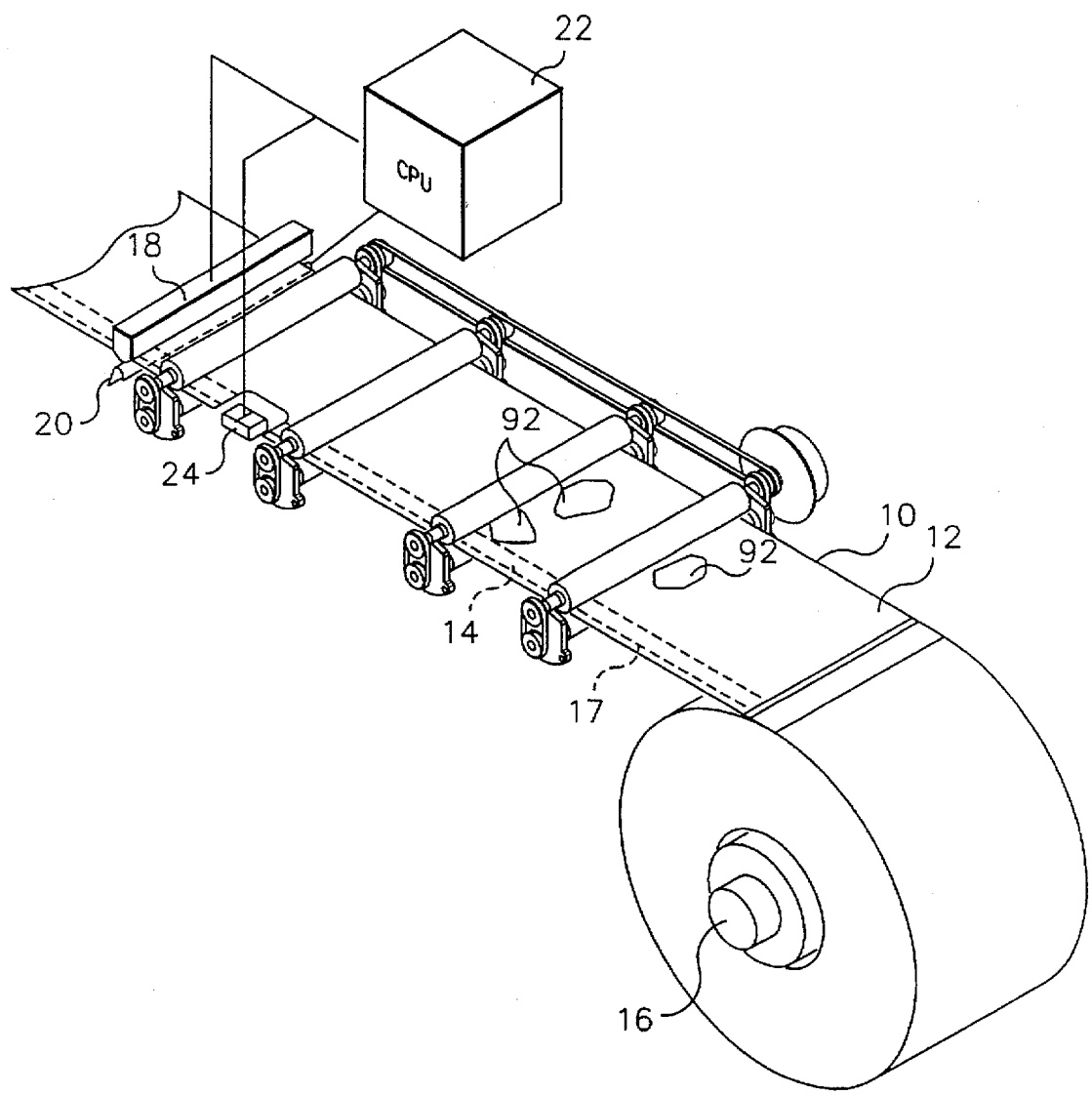
FIG. 1 is a schematic representation of the end portion of the manufacturing of a photosensitive web wherein the web is being loaded onto a supply reel.

Referring to FIG. 1, there is schematically illustrated the final end portion of the manufacturing process of a web 10 of photosensitive material. The web 10 comprises a supporting substrate having an emulsion layer 12 on the top side and a magnetic media 14 placed on the bottom side of the substrate. In the particular embodiment illustrated, the magnetic media 14 comprises a continuous strip 17 which extends along the entire web. However, it is to be understood that the magnetic media may be comprised of any desired form, for example, but not by way of limitation, magnetic media 14 may extend over the entire back surface of a transparent layer, or may comprise more than one continuous or discontinuous strip 17 that is placed along the continuous length. Further, if desired, the magnetic media may be provided by a plurality of portions spaced at periodic distances. Preferably, the magnetic media 14 is substantially continuous along the length as illustrated.

The web 10 is being wound onto a supply reel 16. The manufacturing process includes a pair of sensors 18,20 which extend across the web 10, both on the top surface and on the bottom surface and are used to detect defects. In the particular embodiment illustrated, the sensors 18,20 are optical-type sensors which are used to detect cuts, tears, and scratches in the web. When the sensors 18,20 sense a defect, the sensors 18,20 produce a signal which is relayed to central processing unit 22, i.e., a computer, wherein such information is retained and stored and then put in a form and sent to write head 24, which puts appropriate information on the magnetic media 14. This information can include information such as location, type of defect, and extent of defect. It is, of course, understood that sensors 18,20 may be any type of sensors desired and any number provided for locating any desired defect. Additionally, write head 24 may be placed on either side of the sensor. In the situation where it is necessary to read information before it is paid onto the supply reel 16, the write head will be placed on the side prior to reading the defect as illustrated. However, in situations where the information will need to be read as the photosensitive web 10 is being unwound from the supply reel, then the information may be recorded on the side after the defect. Additionally, the write head 24 is preferably located a distance D from the sensor such that ample time will be provided by any mechanism that is used later on to allow sufficient time to act to the positioning of the defect on the photosensitive web. Information regarding the defect may be written on either side or both sides of the defect. Thus, depending on which direction the photosensitive web is being moved, appropriate read sensors can read the information in sufficient time before any operation occurs on the web.

Figure 2:
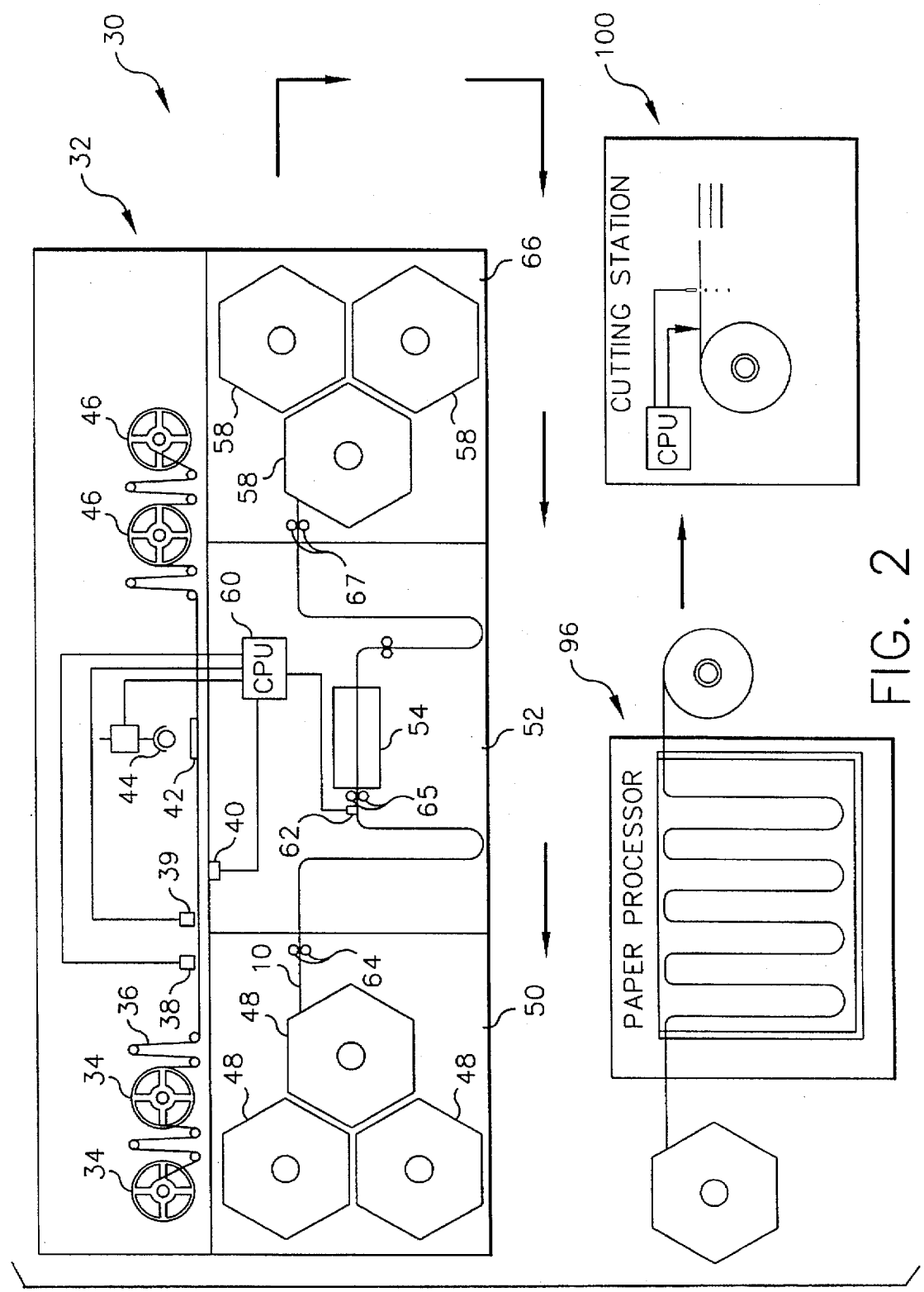
FIG. 2 is a schematic view of a photographic processing system made in accordance with the present invention, which includes a photographic printer, a photographic paper processor, and a cutting station.

Referring to FIG. 2, there is illustrated a photographic processing system 30 made in accordance with the present invention. In particular, the photographic printing system includes a printer 32. An example of such a printer 32 is the Kodak Clas Printer, which produces prints at a rate of approximately seven images per second. Printer 32 includes a pair of supply reels 34, each designed to hold a web of developed negative film 36. The film 36 comprises a plurality of individual strips of negative film that have been developed and spliced together to form a long continuous web, each strip being representative of a single customer order. Typically, a spliced tape (not shown) is used to connect the adjacent customer orders which generally contain customer identification order information. The printer 32 also has various sensors 38,39 for scanning the film and splice tape. In the particular embodiment illustrated, the sensor 38 is a CCD (charged couple device) array for scanning the developed image on the film and the information obtained is typically used to provide exposure control information. The sensor 39 may be used to read information that is present on the splice tape. There has recently been suggested that the film may have a thin, transparent magnetic layer on the side of the film opposite the emulsion side where the information can be magnetically read. Information may include printing information supplied by the customer and/or film manufacture. In order to read this information, a magnetic read head 40 is provided. The film 36 is driven past a film print gate 42 whereby a light source 44 is used to successively expose individual images on the negative film 36. Thereafter, the film is fed onto one of the take-up reels 46. As one of the supply reels 34 is emptied, the other reel 34 would be fed onto the empty take-up reel 46.

The printer 32 includes a plurality of supply magazines 48, each containing a reel having a continuous web 10 of photosensitive material wound therein. In the present invention illustrated, the photographic web 10 comprises photographic paper. In the embodiment illustrated, there are three supply magazines 48, so that when the reel located at the delivery position is emptied, the next film magazine in line can be quickly shifted to the delivery position so as to maintain productivity. The photosensitive web 10 passes from the supply magazine area 50 to the printing section 52 having a print area 54 wherein the images on the negative film 36 are exposed onto the web 10 of photographic paper. After exposure, the photosensitive web 10 is passed onto a take-up area 66 and wound onto a take-up reel provided in take-up magazine 58. In the particular embodiment illustrated, a plurality of take-up magazines 58 are also provided so that a fully loaded take-up magazine 58 can be removed while an empty take-up magazine is placed into the position for receipt of the exposed web 10 of photosensitive paper. The printer 32 further includes a microprocessor 60 which is used to control operation of the entire printer 32, including the intensity of the light 44. The microprocessor 60 is connected to sensors 38,39, which uses the information obtained for controlling operation of the printer 32. The microprocessor 60 is also connected to a magnetic read head 62 provided in a read mechanism 63 which is used to read information contained on the magnetic media 14 placed on web 10. The read head 62 is located prior to the printing area 54 where the photosensitive web 10 is exposed. Appropriate means are provided for moving of the web 10 through the printer 32, for example, appropriate drive rollers 64,65,66, 67 are provided for transporting and moving of the web 10 through the processor. However, it is to be understood that web 10 may be transported therethrough in any desired manner. The information contained on the magnetic media is passed through CPU/microprocessor 60 such that when information regarding a defect is detected, appropriate activation of the transport mechanism is provided for advancing of the web 10 such that the defect will not be located at the print area 54, thus avoiding printing thereon. As is preferably illustrated, the read head 62 is placed immediately adjacent drive rollers 65, which can be used to meter the amount of photosensitive material that is passed into the print area 54, thus, any information contained on the magnetic media regarding the location of a defect can be accurately determined and avoided during printing.

Figure 3:
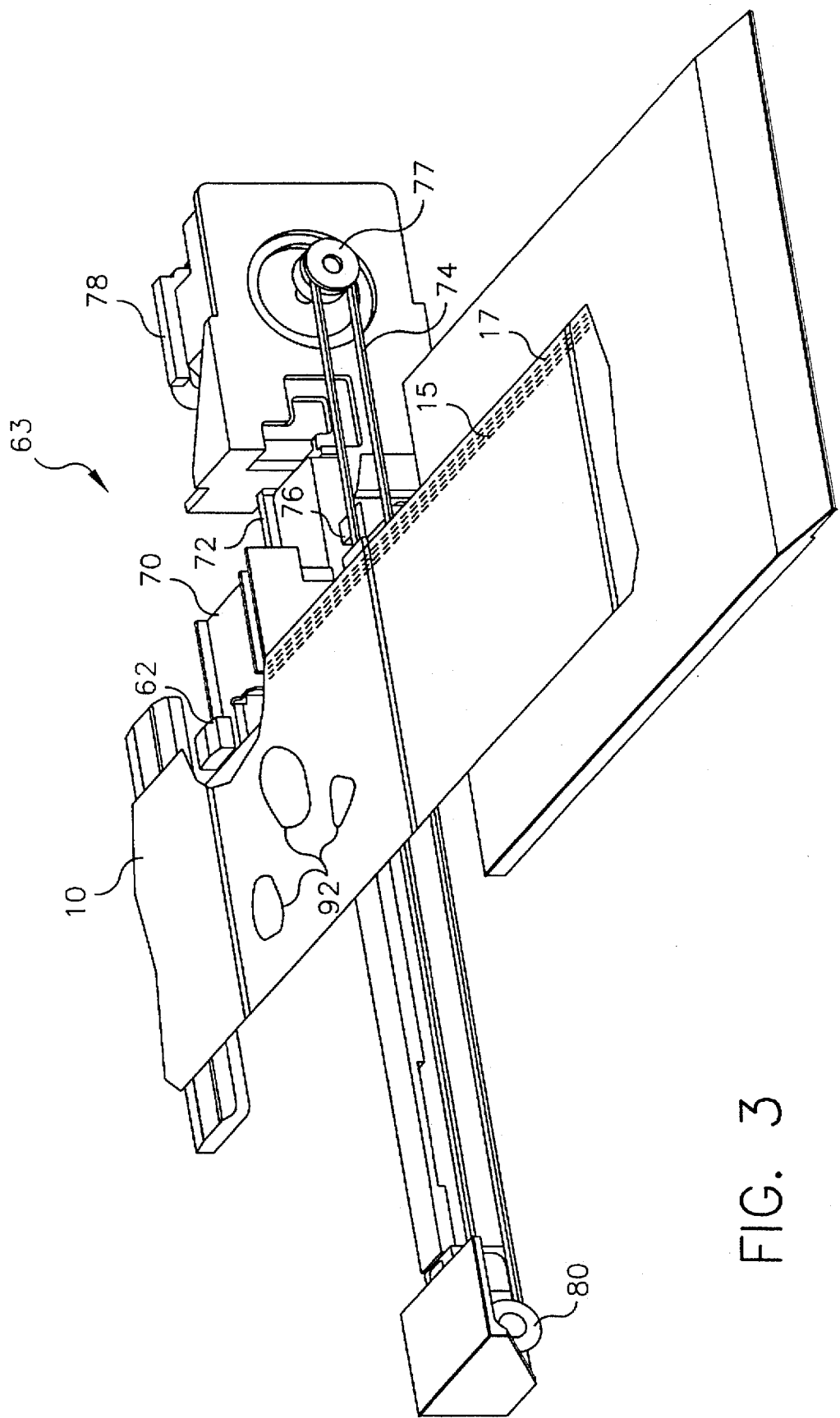
FIG. 3 is a perspective view of a portion of the printing apparatus of FIG. 2 illustrating the mechanism used to read informational data on a photosensitive material prior to printing.

Referring to FIG. 3, there is illustrated a perspective view of the read mechanism 63 containing read head 62 used to read information on the magnetic media. The read mechanism 63 includes read head 62, which is positioned so as to read the information contained on the strip of magnetic media provided on web 10. In the embodiment illustrated, the read mechanism 63 is provided with means for appropriate locating of the magnetic read head 62 such that it can be aligned into proper alignment with the magnetic media provided on the web 10. Thus, the read mechanism 63 can be adjusted to accommodate any size photosensitive material and location of the magnetic media. In the embodiment illustrated, the read head 62 is secured to a mounting block 70, which is slideably mounted to frame 72. Block 70 is slid along frame 72 by a belt 74 secured to a connecting member 76, having one end secured to the mounting block 70 and the other end secured to the belt 74 by appropriate fastening means. The belt 74 is wrapped around a drive pulley 77, which is secured to the shaft of motor 78. The motor 78 is also mounted to frame 72. The belt 74 is also wrapped around an idler pulley 80 such that a magnetic read head 62 may be moved such that it is positioned adjacent the magnetic media. The thickness of the magnetic media 14 may be selected as desired so long as it is capable of retaining magnetic information recorded thereon. While in the particular embodiment illustrated the magnetic media comprises a continuous strip 17, it may be intermittent, or placed along the entire back surface of the photosensitive web 10. In the preferred embodiment illustrated, the magnetic media 14 is placed on the side of the web opposite the emulsion side, however, as desired, the photographic media may be such that the magnetic media 14 is placed on the same side and the emulsion, the extended along the extended edge area for possibly a transparent magnetic layer over the image area. The present invention is not limited to a particular media construction. It is only necessary that appropriate magnetic media be provided on the photosensitive web such that there is a sufficient amount of magnetic media present so that appropriate information can be written and read therefrom.

Figure 4:
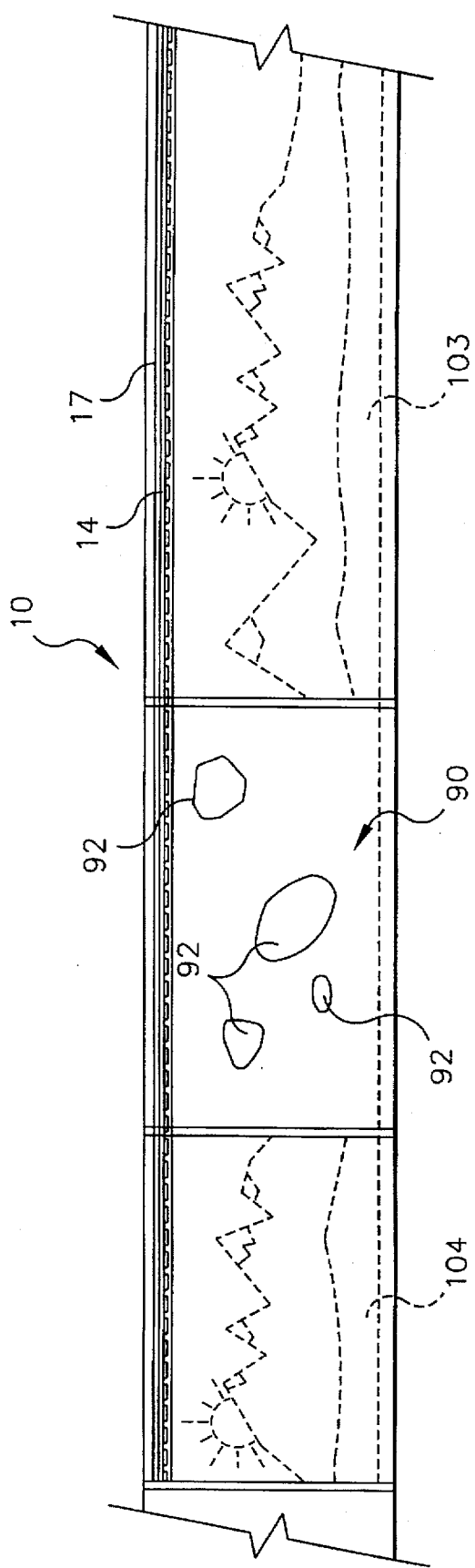
FIG. 4 is a plan view of the backside of the photosensitive material illustrated in FIG. 3.

Referring to FIG. 4, there is illustrated the web 10 after the images have been printed onto photosensitive material and after the images have been developed through the processor. As can be seen, the web 10 includes an area 90 having a plurality of defects 92. The information provided on the magnetic media 14 was read such that portion of the web 10 containing the defects 92 would be caused to be advanced past the print gate, thus avoiding developing of the images thereon. As can be seen, images 103,104 are provided immediately on either side of the defect area, thus minimizing any potential waste of photosensitive material.

The system 30 also includes a processor 96 where the exposed web is taken and developed as is customarily done in the art. After development, the web is passed onto the cutting station 100.

Figure 5A:
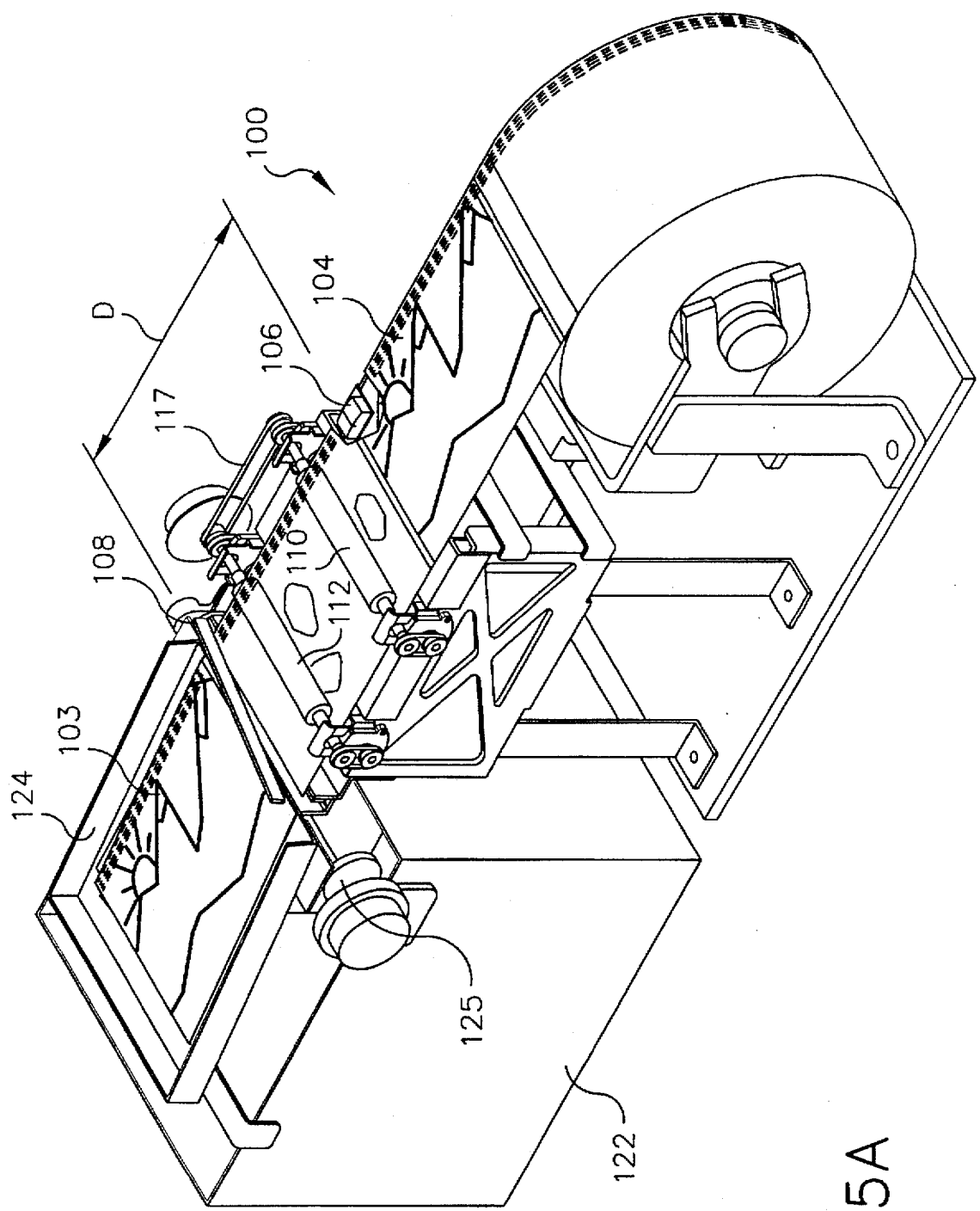
FIG. 5a is a perspective view of a cutting station in accordance with the present invention used to separate individual images of a photographic web and defects contained therein as illustrated in FIGS. 3 and 4 illustrating the receiving tray in a first position.
Figure 5B:
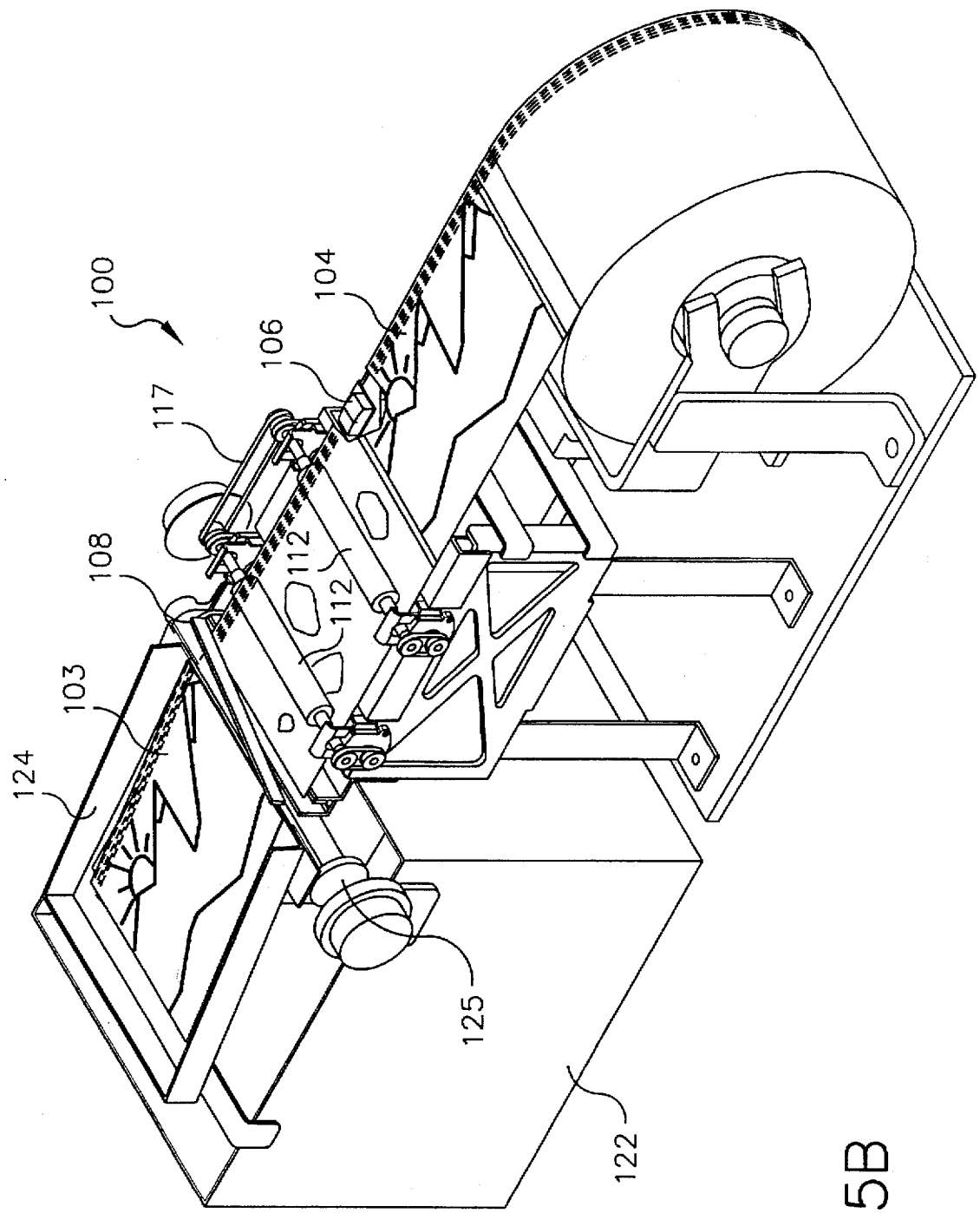
FIG. 5b is similar to FIG. 5a illustrating the receiving tray in a second position.

Referring to FIGS. 5a and 5b, there is illustrated in greater detail cutting station 100 made in accordance with the present invention. Cutting station 100 is provided with means for holding a roll of developed photosensitive web 10 having images 103,104 thereon. The cutting station 100 includes a read head 106, which is disposed on the side adjacent the magnetic media 14 for reading of information. The cutting station 100 includes a knife 108, which is positioned a predetermined distance D from the read head 106. The read head 106 is able to read instructions on media 14 and provide control information to a control unit (not shown), which controls knife 108 such that individual images formed on web 10 will be cut therefrom at the appropriate location. Additionally, the read head 106 provides appropriate instruction for cutting and removing portions of the web 10 containing defects 92. Drive rollers 110,112 are used as metering rollers for metering and transporting of the web 10 past the knife 108. An appropriate stepper motor 114 is used for controlling and metering a predetermined amount of the web 10 so that the desired point at which cutting is to occur is provided in accordance with the instructions provided on the magnetic media 14. A belt 117 is used to connect rollers 110,112 so that they move in the same direction and at the same rate. The stepper motor is, of course, controlled by a central processing unit (not shown), which controls automatic operation of the knife and any of the other parts associated with the cutting station 100.

In addition to providing cutting and location instructions on the magnetic media, read head 106 can also provide other information, for example, information for sorting customer orders as is more fully described in copending patent application U.S. Ser. No. 08/625,623; filed Mar. 29, 1996; entitled SYSTEM FOR PROCESSING A PHOTOSENSITIVE MATERIAL, by Ronda E. Factor, which is hereby incorporated by reference.

The cutting station 100 also includes a means for deflecting the portion of the web 10 containing the defects into a waste container 122 provided below receiving tray 124. In the embodiment illustrated, a cam 125 is rotated by motor 126 so as to lift tray 124 out of the path of web 10 so that the web will fall below tray 124 into waste container 122. FIG. 5a shows the tray 124 in the up position for disposing waste into the container 122 and FIG. 5b shows the position of the tray 124 in the lowered position for receiving prints from web 10.

In order to more clearly understand the present invention, a discussion of its operation follows.

First, as illustrated in FIG. 1, the web is scanned by scanners 18,20 for any defects present thereon, and any defects that are detected are sent over to CPU 22 which then in turn provides appropriate information to write head 24 which writes appropriate information regarding the defects onto the magnetic media 14. Thereafter, when the web 10 is placed in printer 32, read head 62 reads the information contained on the magnetic media 14 such that when it is determined that a defect is present, its location and size are determined and the web 10 is advanced past the print area 54 such that printing will not occur where the defects are present. Thereafter, the web 10 is wound onto the take-up reel and taken to the processor 96 where it is developed, and thereafter to the cutting station 100 where the images are separated from the web 10 by customer order and the areas containing defects are removed by reading of the magnetic media 14 by read head 106 which thereby activates the knife 108 accordingly so as to discard the portion of the web containing the defect.

Figure 6:
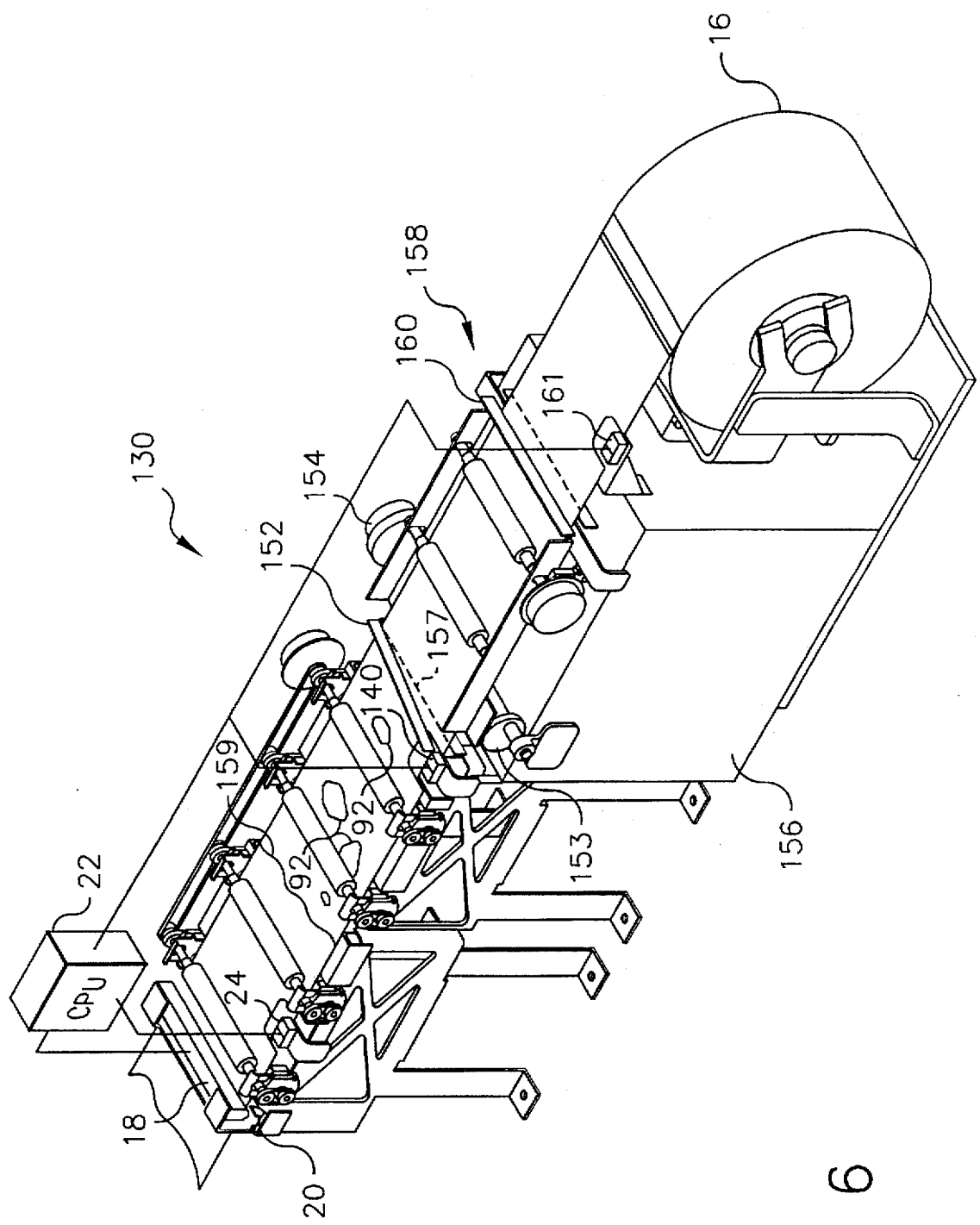
FIG. 6 is a schematic illustration of a modified manufacturing process made in accordance with the present invention illustrating a web of photosensitive material being wound onto a supply reel.

Referring to FIG. 6, there is illustrated a modified form of the present invention. In particular, there is illustrated a view similar to FIG. 1, except in this embodiment the area of the web containing the defect is removed immediately prior to being placed on the take-up reel. System 130 is similar to the system 30 illustrated in FIGS. 1, 5a, and 5b, like numerals indicating like parts and operation. In this embodiment, a second read head 140 is provided adjacent a cutting knife 152, which is used to cut the portion of the web 10 containing defect. A cam 153 is appropriately activated by motor 154 for moving of the web 10 prior to the defect so that the portion of web 10 containing defects 92 is directed into waste container 156. The end 157 of the web 10 prior to the defect is moved to splice station 158 wherein the beginning end 159 of the web 10 just after the portion that has been removed containing the defect is spliced back to the web 10 until appropriate amounts of photosensitive material is paid out onto the take-up reel 16. A splicer 160 is used to splice the free ends of web 10 together. Appropriate information is written onto the magnetic media by write head 161 indicating the present and location of the splice so that portion of the material will not be used during printing or any other later operation. This is particularly useful when large portions of the web must be removed and, thus avoid needless running of the printer during later operation. Thus, there is only a need to avoid a very small area containing a splice.

Figure 7:
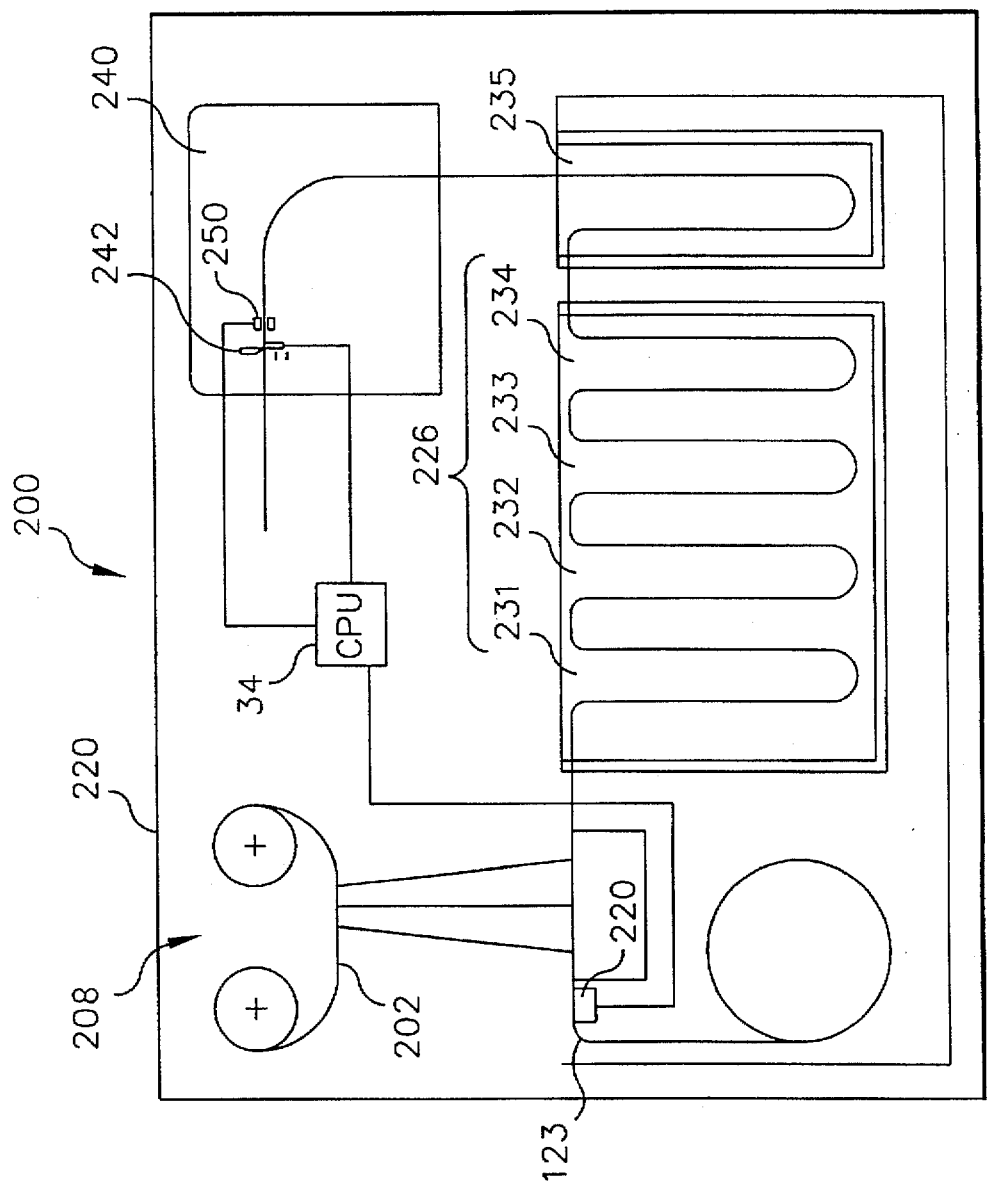
FIG. 7 is a schematic view of a photographic minilab made in accordance with the present invention used to print and process a web of photosensitive material.

Referring to FIG. 7, there is illustrated a modified form of the present invention. In this embodiment there is illustrated schematically a photographic minilab 200 made in accordance with the present invention. In particular, minilab 200 includes a print station 208 whereby photographic film 202 is exposed at exposure station 210. Minilab 200 also includes a magnetic read mechanism 220 which is similar in structure and operation to that of magnetic read mechanism 63, previously described. The magnetic read mechanism 220 provides the appropriate information regarding the photosensitive web 123, which is passed through the print gate. Appropriate advancing mechanism is provided for advancing the web 10 past the print gate so that portions containing defects will not be printed. Processing section 226 comprises a plurality of processing tanks 231,232,233,234 containing typical processing solutions and a drain section 235. Thereafter, a photosensitive material is passed onto dryer section 240 and passed over read head 250 for reading the magnetic strip 17. The information read controls knife 242, which thereby cuts the web 10 into individual prints, separating the defected portions of container defects in the same manner previously described.

Figure 8:
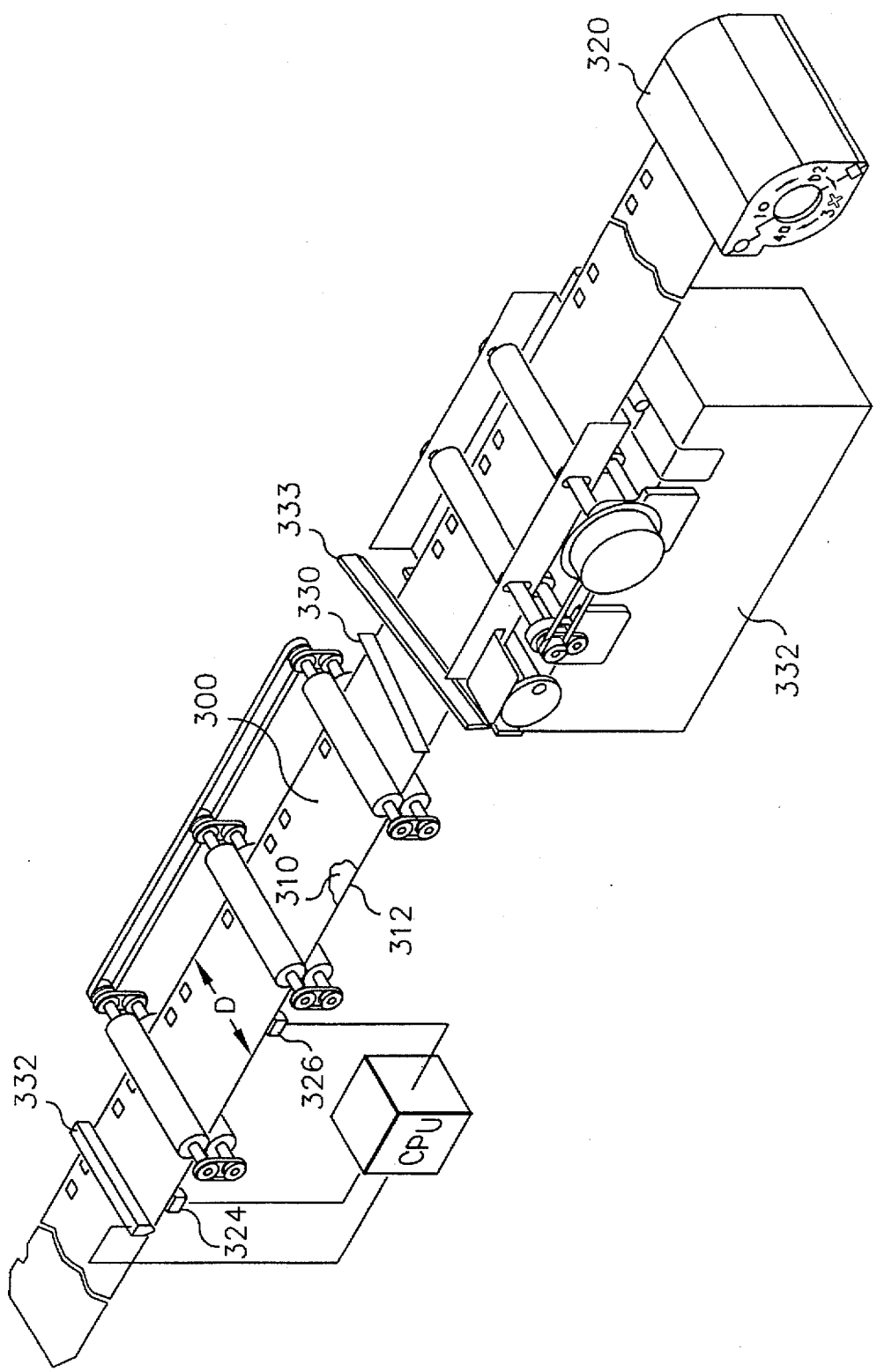
FIG. 8 is a schematic view of a modified manufacturing process for loading photosensitive material into a film cartridge.

Referring to FIG. 8, there is illustrated yet another modified form of the present invention. This embodiment is similar to that illustrated in FIG. 1, like numbers indicating like parts and operation. In this embodiment, the photosensitive material comprises a photographic film 300 having a transparent magnetic layer across the entire back portion 312 of the web 310. The film 300 has a width D sized so as to fit within a film cartridge 320. The film 300 is appropriately scanned by scanner 322 and information is recorded by write head 324 on film 300 regarding any defects. Thereafter, a second read head 326 reads the magnetic head, and knife 330 removes the portions containing defects. In the embodiment illustrated, portions of web 310 having defects 92 are removed and placed in waste container 332 by appropriate means such as previously described. A splicer 333 is provided to splice the web 310 as required. Thereafter, the film web 310 is inserted into the film cartridge 320 as illustrated. If an insufficient amount of film is present to provide the appropriate length, that too will be diverted and not placed within the film cartridge 320. This device assures that the highest quality film is placed into each film cartridge 320.

It is to be understood that various other changes and modifications may be made without departing from the scope of the present invention. The present invention being limited by the following claims.

Parts List

10 . . . web
12 . . . layer
14 . . . magnetic media
16 . . . supply reel
17 . . . strip
18,20 . . . sensors
22 . . . central processing unit
24 . . . write head
30 . . . photographic processing system
32 . . . printer
34 . . . supply reels
36 . . . negative film
38,39 . . . sensors
40 . . . read head
42 . . . film print gate
44 . . . light source
44 . . . take-up reel
46 . . . magazines
50 . . . magazine area
52 . . . printing section
54 . . . print area
58 . . . take-up magazine
60 . . . CPU/microprocessor
62 . . . read head
63 . . . read mechanism
64,65,66,67 . . . drive rollers
66 . . . take-up area
70 . . . mounting block
72 . . . frame
74 . . . belt
76 . . . connecting member
77 . . . drive pulley
78 . . . motor
80 . . . idler pulley
90 . . . area
92 . . . defects
96 . . . processor
100 . . . cutting station
103,104 . . . images
106 . . . read head
108 . . . knife
110,112 . . . drive rollers
114 . . . stepper motor
117 . . . belt
122 . . . waste container
123 . . . photosensitive web
124 . . . receiving tray
125 . . . cam
126 . . . motor
130 . . . system
140 . . . read head
152 . . . cutting knife
153 . . . cam
154 . . . motor
156 . . . waste container
157 . . . end
158 . . . splice station
159 . . . beginning end
160 . . . splicer
161 . . . write head
200 . . . minilab
202 . . . photographic film
208 . . . print station
210 . . . exposure station
220 . . . magnetic read mechanism
226 . . . processing section
231,232,233,234 . . . processing tanks
235 . . . drain section
240 . . . dryer section
242 . . . knife
250 . . . read head
300 . . . photographic film
310 . . . web
312 . . . back portion
320 . . . film cartridge
322 . . . scanner
324 . . . write head
326 . . . read head
330 . . . knife
332 . . . waste container
333 . . . splicer

I claim:

1. A system for detecting and coding a defect on a photosensitive web containing a magnetic media, said system comprises:

a scanner for scanning a photosensitive web for determining defects on the photosensitive web and producing a signal which provides information with respect to the defects on said magnetic media;

means for taking said signal and transforming it to a form capable of being placed onto the magnetic media; and means for recording said information with respect to the defects onto said web.

2. The system according to claim 1 further comprising a cutter for removing a portion of said web in accordance with said information stored on said magnetic media regarding said defect.

3. The system according to claim 1 wherein said scanner is capable of determining optical defects present in said photosensitive web.

4. The system according to claim 1 wherein said scanner is capable of determining physical defects to said photosensitive web.

5. The system according to claim 1 wherein said photosensitive web is paper.

6. The system according to claim 1 wherein said photosensitive web is film.

7. The system according to claim 1 further comprising means for rolling said web onto a reel.

8. The system according to claim 7 further comprising means for cutting said defect out of said web prior to being placed on said reel.

9. The system according to claim 1 wherein said magnetic media comprises a thin magnetic layer placed substantially over the surface of said web.

10. An apparatus for printing images on a photosensitive web, said web having a magnetic media containing information regarding defects on said web, said apparatus having a reader for reading information recorded on said magnetic media, a print gate for locating of said photosensitive web for printing, and means for advancing said photosensitive web so that any defect present on said web will not be located at said print gate so as to avoid printing images on the portion of said photosensitive web having said defect.

11. An apparatus according to claim 10 further comprising means for cutting said defect out of said web and separating this from the images printed.

12. A method for detecting and coding a defect on a photosensitive web containing a magnetic media, comprising the steps of:

a) scanning a photosensitive web for defects on said web and producing a signal which is indicative of a defect;

b) providing information on said magnetic media regarding placement, location, and type of defects detected on said web; and c) removing said defect from said web prior to said web being placed on a supply reel.

13. A method according to claim 12 further comprising the step of removing a portion of said web in accordance with said information recorded on said magnetic media.

14. A method of printing images on a photosensitive web containing a magnetic media, wherein said magnetic media has information recorded on said magnetic media regarding any defect present on said web, comprising the steps of:

a) printing a plurality of images on said web;

b) reading said magnetic media so as to determine the location, type, and placement of said defects; and c) advancing said web such that said image being printed on said web does not occur on said web where said defect is located.

15. A method for loading a photosensitive web into a plurality of film holders, said web having a magnetic media, comprising the steps of:

a) scanning said web with a scanner capable of detecting defects present on said web;

b) recording information on said magnetic media regarding said defect;

c) loading said photosensitive material onto a plurality of film holders; and d) reading said information on said magnetic media prior to loading the web into said holders so that the portion of the web having said defect will not be loaded into said holder.

\* \* \* \* \*